Oct. 8, 1957 — J. W. SCHUMACHER — 2,809,035
WALKING BARREL FOR BULLFIGHTING
Filed Feb. 8, 1954

INVENTOR.
James W. Schumacher
BY
Whitehead & Vogl
Per Garl Whitehead
Attorneys

United States Patent Office 2,809,035
Patented Oct. 8, 1957

2,809,035

WALKING BARREL FOR BULLFIGHTING

James W. Schumacher, Phoenix, Ariz.

Application February 8, 1954, Serial No. 408,854

2 Claims. (Cl. 272—1)

This invention relates to devices for use primarily in arenas of rodeos and like performances for fighting or clowning with animals such as bulls and specifically to what is known as a "walking barrel."

The general object and purpose of the invention is the provision of a device which may be used in a variety of ways in fighting or clowning performances with ferocious animals such as bulls and which shall, during such performances, furnish protection from injury to the performer.

In participation in such performances, in the arena, applicant has discovered that a device in the general form of a barrel, having both ends open and having certain appliances incorporated therein, may be used in many ways in providing amusing situations as well as furnishing effective protection to the user, and accordingly, objects of the present invention are to provide a generally barrel-shaped device having great durability and strength; provided with means for preventing unnecessary injury to the animal; within which the performer may hide himself while the device is either stationary or rolling; with which the performer may encircle himself while standing or moving; which he may carry while thus encircled and which he may use as a shield between himself and the animal.

With the foregoing and other objects in view, all of which shall more fully hereinafter appear, the invention comprises certain novel constructions, arrangements and combinations of parts and elements as described and defined in the following specification and claims and illustrated, in preferred embodiment, in the accompanying drawing in which:

Figure 1:
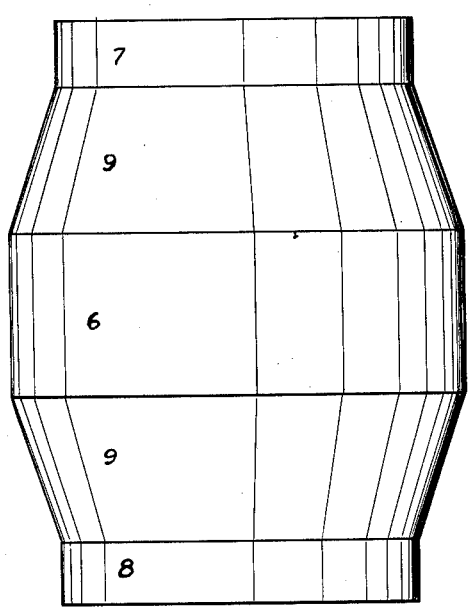
Figure 1 is an elevation view of my "walking barrel" embodying this invention.
Figure 3:
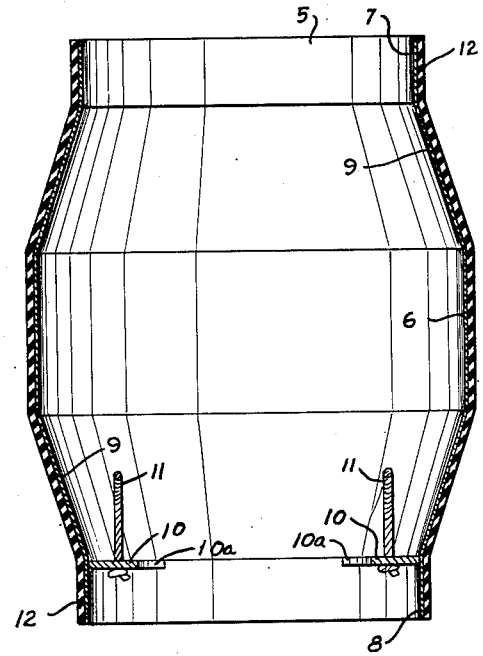
Figure 3 is a vertical sectional view on the indicated line 3—3 at Fig. 2.
Figure 2:
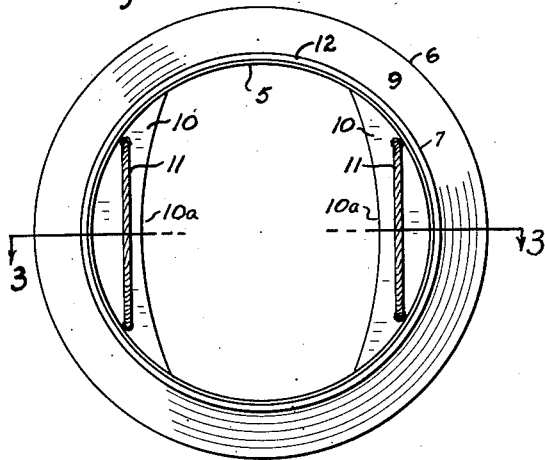
Fig. 2 is a view looking down into the barrel from the top.

The barrel 5 is formed as a substantially cylindrical, open-end shell which must be circular in section to permit it to be rolled about as by an enraged animal. This shell must be of sufficient strength to protect the occupant and to withstand battering by the the animal, and is preferably of aluminum or other light weight metal. The barrel comprises a central cylindrical portion 6 of maximum diameter, with the ends 7 and 8 being smaller cylindrical sections joined to the central section by conically tapering sections 9. The converging ends of this open-end barrel function in several ways. In the first place, the entire construction is rigidified by the conical sections 9. Secondly, such tapers permit an occupant to hump and wedge his shoulders against tapering sections 9 to prevent his being thrown out of the barrel whenever an animal butts and rolls it. Also the occupant may shift to tip the barrel and make it roll in a circular path.

Near the bottom of the barrel, and preferably within the bottom portion 8, two opposed arcuate shelves 10 are secured to the inner wall of shell 5 by suitable means such as welding. The material and mounting of the shelves must be strong enough to support the weight of the performer so that he may stand thereon within the barrel when desired. Handle loops 11 of rope or other suitable material, are mounted in the shelves, the ends of each loop being secured to the shelves near the ends thereof so as to better balance the barrel when being carried by the performer as hereinafter described.

The shelves 10 preferably have their inner edges 10a arcuate in order to provide larger space between the shelves for the performer's legs when standing in or walking with, and carrying, the barrel.

In order to prevent unnecessary injury to the performing animal, the shell 5 is preferably covered with some softer but durable material indicated at 12. This cover may be formed to completely enclose the shell or in the form of rings which may be made from discarded auto tires. Some relatively soft and resilient material such as rubber is preferable.

In performances the performer may use the barrel in a variety of ways such, for example, as standing by the barrel, with the barrel on end, and keeping it between the animal and himself, standing inside the barrel, either on the floor or on the shelves and, when charged by the animal, doubling himself up within the barrel while it is tumbled and rolled by the animal, rolling it on the arena floor to attract the animal's attention, standing within the barrel and picking it up by the handles 11 and walking or running while thus carrying the barrel, and many other ways.

While I have illustrated and described many details of construction, alternatives and equivalents will occur to those skilled in the art and within the spirit and scope of the invention and I therefore desire that my protection be not limited to the details illustrated and described but only by the proper scope and interpretation of the appended claims.

I claim:

1. A safety barrel for use in fighting and clowning with animals, such as bulls, comprising, in combination, a rigid substantially cylindrical shell open at both ends and converging in diameter from a central section of maximum diameter to a smaller diameter at each end, opposed supporting shelves mounted inside the shell near one end thereof, and a handle near each shelf, said barrel having a diameter and height sufficient to permit a man to double up therewithin and said handles extending above the shelves at a height sufficient to permit a man doubled up within the barrel with his feet upon the shelves to grasp the handles and hold himself within the barrel.

2. A safety barrel for use in fighting and clowning with animals, such as bulls, comprising, in combination, a rigid substantially cylindrical shell open at both ends and converging in diameter from a central section of maximum diameter to a smaller diameter at each end, opposed supporting shelves mounted inside the shell near one end thereof, and a rope handle attached to each shelf, each handle having its ends secured to opposite end portions of its shelf and extending above the shelf, said barrel having a diameter and height sufficient to permit a man to double up therewithin and said rope handles extending above the shelves at a height sufficient to permit a man doubled up within the barrel with his feet upon the shelves to grasp the rope handles and hold himself within the barrel.

References Cited in the file of this patent

UNITED STATES PATENTS

| 810,734 | Fagan | Jan. 23, 1906 |
| 1,297,473 | Johnson et al. | Mar. 18, 1919 |

OTHER REFERENCES

"The American Toreador," by George Scullin, Bluebook, October 1953, pages 49–55.